Patented Oct. 22, 1940

2,219,005

UNITED STATES PATENT OFFICE 2,219,005

FORMATION OF CHROMIUM-CONTAINING LAYERS ON THE SURFACE OF FERROUS ARTICLES

Karl Daeves and Gottfried Becker, Dusseldorf, and Fritz Steinberg, Krefeld, Germany No Drawing. Application December 7, 1939, Serial No. 307,982. In Germany December 13, 1938

5 Claims. (Cl. 148—14)

According to a former proposal articles of iron and steel may be chromized by using a so-called carrier consisting of small pieces of ceramic material such as porcelain or sillimanite charged with a chromium chloride compound and surrounding the articles to be treated by this carrier material in a container, which then will be closed and heated to temperatures of about 900–1000° C. for a period of time. According to a later proposal the packing material may be composed of a mixture made of the carrier material described as above and pieces of ferrochromium. In both cases the ceramic material may be charged with the chromium chloride compound by treating the ceramic pieces for about 4 to 5 hours with hydrochloric acid gas in the presence of ferrochromium at elevated temperatures. The carrier also may be charged by vaporizing chromium chloride salt in the presence of the ceramic material and in the absence of oxygen. An addition of ferro-chromium is not necessary, but preferable.

Now it has been found that it is also possible to charge the ceramic material such as sillimanite or porcelain with the chromium compound in the liquid phase of this compound by a so-called impregnation process and that this method in some cases may be advantageous because it avoids the high temperatures, which are necessary if the ceramic material is to be charged with the chromium compound in the gaseous phase.

According to the invention porous ceramic material of the type of sillimanite or porcelain is treated in an aqueous solution of chromium chloride and thereafter dehydrated in absence of oxygen. The dehydration of the carrier material proceeds at comparatively low temperatures and in the hydrochloric acid gas atmosphere, developing during the process itself. In order to utilize any excess of hydrochloric acid gas, it is to be preferred to make an addition of metallic chromium or of chromium alloys to the porous carrier material during the dehydration. To obtain a better and faster impregnation, the impregnation solution may be heated, and the process of saturation may be further improved by using a vacuum or high pressure. Instead of impregnating the ceramic material in an aqueous solution of chromium chloride, also a bath of molten salts can be used. For instances, the following procedures are to be recommended:

Carriers made up of a porous ceramic material, e. g. of the well-known tiles, in the form of pieces of about 3–6 mm. are boiled in an aqueous solution containing about 20 to 30 per cent of $CrCl_3$ for a sufficient time until they are completely impregnated. Then the excess solution is allowed to drip off or is shaken off and subsequently the pieces are heated in the absence of oxygen, hydrochloric acid gas serving as a protective atmosphere. The drying temperature depends upon the time in which the dehydration shall be performed; preferably, drying should be made at temperatures from 400 to 600° C.

When using a carrier of ceramic material impregnated according to the invention with chromium chloride, it has further been found that a high purity of the chromium chloride solution is not required, but that the solution may also contain amounts of iron chloride. This has the advantage that the impregnating solution may be prepared from commercial chromium compounds or alloys, for instance, by dissolving commercial ferrochromium in hydrochloric acid. Furthermore it does not matter if the solution contains an excess of hydrochloric acid or whether the proportion of the iron chloride exceeds that of chromium chloride. In the latter case, of course, it is necessary to add chromium compounds or chromium alloys, e. g. ferrochromium, to the carrier material during the chromizing process. If according to the invention the carrier material is charged also with iron chloride, in addition to chromium chloride or with iron chloride alone, then all the disadvantages resulting from the volatility of the iron chloride will be avoided; for it had been found that porous ceramic carrier material which has been charged with iron chloride, e. g. pieces of sillimanite or porcelain, delivers the iron chloride but slowly and, therefore, adds to the completely uniform distribution of the chromizing atmosphere.

The advantages of chromizing articles of iron and steel by using ceramic carrier materials charged with a chromium compound as above are the high uniformity of the gaseous phase during the chromizing process, the good performance of the chromizing process itself as well as the good packing of the articles to be treated during the chromizing process. For the selection of the carrier material it is especially important that it contains as few constituents as possible which tend to form compounds with the chromium chloride, as for instance alkali and alkaline earth silicates. Materials containing greater amounts of such substances are not so desirable as carrier material in the chromizing process, since they slag a substantial amount of the chromium and thus prevent it from reaction.

The dimensions of the carrier material may be varied according to the dimensions of the articles to be treated. In any case, it should have the form of pieces and not be pulverized or sandy and should be of such a size that the articles to be treated are surrounded with it as uniformly as possible. Carrier material of a size of 3 to 6 mm. is to be preferred for articles of medium size.

We claim:

1. A process for forming chromium-containing layers on the surface of ferrous articles by allowing gaseous chromium chloride to act on the surface at high temperatures of about 1000° C., characterized in surrounding the articles in a container by a packing consisting of porous ceramic material such as porous sillimanite or porcelain charged with the chromium chloride compound by impregnation with chromium chloride in liquid phase, subsequently converting the chromium chloride to solid phase, and heating the so packed articles at temperatures of 900–1000° C. until the surface of the articles is chromized in the desired manner.

2. A process according to claim 1 characterized in that molten chromium chloride salt is used for charging the carrier material.

3. A process according to claim 1 characterized in that the material in liquid phase employed for impregnating the carrier material comprises also iron chloride in addition to chromium chloride.

4. A process according to claim 1 characterized in that the liquid phase impregnating material of the carrier material is converted to solid phase by heating same in the presence of chromium compounds or alloys.

5. A process according to claim 1, in which the impregnation with chromium chloride is performed with an aqueous solution and the impregnated material is thereafter dried by heating in the absence of oxygen.

KARL DAEVES.
GOTTFRIED BECKER.
FRITZ STEINBERG.